Figure 1:
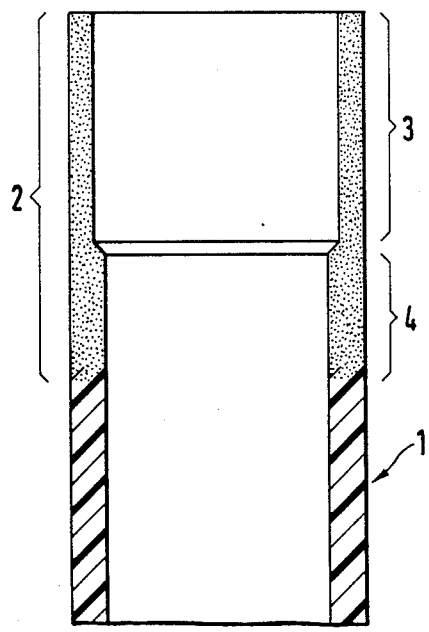

United States Patent [19]

Horwege et al.

[11] Patent Number: 4,933,135
[45] Date of Patent: Jun. 12, 1990

[54] METHOD OF MAKING A BLOW-MOULDED CONTAINER FROM A THERMOPLASTIC POLYESTER, IN PARTICULAR PET

[75] Inventors: Claus Horwege; Wolfgang Reymann, both of Hamburg, Fed. Rep. of Germany

[73] Assignee: Krupp Corpoplast Maschinebaur GmbH, Fed. Rep. of Germany

[21] Appl. No.: 274,205

[22] Filed: Nov. 21, 1988

[30] Foreign Application Priority Data

Nov. 27, 1987 [DE] Fed. Rep. of Germany ....... 3740343

[51] Int. Cl.⁵ .............................................. B29C 49/64
[52] U.S. Cl. .................................... 264/521; 264/235; 264/533
[58] Field of Search ............... 264/521, 533, 537, 540, 264/346, 235; 425/526

[56] References Cited

U.S. PATENT DOCUMENTS

| | | | |
|---|---|---|---|
| 4,164,298 | 8/1979 | Nishikawa et al. | 264/521 |
| 4,339,409 | 7/1982 | Curto | 264/521 |
| 4,375,442 | 3/1983 | Ota et al. | 264/521 |
| 4,379,099 | 4/1983 | Ota et al. | 264/521 |
| 4,476,084 | 10/1984 | Takada et al. | 264/521 |
| 4,499,044 | 2/1985 | Höne et al. | 264/521 |
| 4,564,497 | 1/1986 | Ota et al. | 264/521 |
| 4,572,811 | 2/1986 | Ota et al. | 264/521 |
| 4,589,559 | 5/1986 | Hayashi et al. | 264/521 |
| 4,590,021 | 5/1986 | Ota et al. | 264/521 |
| 4,704,243 | 11/1987 | Nilsson et al. | 264/521 |

FOREIGN PATENT DOCUMENTS

| | | | |
|---|---|---|---|
| 0155763 | 9/1985 | European Pat. Off. | 264/521 |
| 57-201631 | 12/1982 | Japan | 264/521 |
| 58-92536 | 6/1983 | Japan | 264/521 |
| 58-110221 | 6/1983 | Japan | 264/521 |
| 59-138417 | 8/1984 | Japan | 264/521 |

Primary Examiner—Jan H. Silbaugh
Assistant Examiner—Catherine Timm
Attorney, Agent, or Firm—Ernest A. Beutler

[57] ABSTRACT

To improve the properties of biaxially orientated blow-moulded containers of PET the mouth region of the container serving for fitting a closure member is heat-set, i.e. crystallized at elevated temperature. The heat-setting is effected at the mouth end of a parison or preform and the previously heat-set mouth end is then reshaped to the finished mouth portion. This improves the dimensional stability of the mouth region.

4 Claims, 1 Drawing Sheet

U.S. Patent

Jun. 12, 1990

4,933,135

METHOD OF MAKING A BLOW-MOULDED CONTAINER FROM A THERMOPLASTIC POLYESTER, IN PARTICULAR PET

The invention relates to a method of making a blow-moulded container from a thermoplastic polyester, in particular PET. The invention further relates to parisons or preforms suitable for carrying out the method.

According to the prior art, documentation of which is not necessary, blow moulding containers proceed from a parison or preform which is extruded or injection moulded. The parison serving for the blow moulding comprises a closed bottom and an end reformed to a mouth section. The mouth or opening section serves for fitting a closure member or cap and is as a rule provided with a thread. It may however also be an annular bead for fitting a crown cork or cap. For higher strength and improved gas-barrier properties of the container it is known to effect a biaxial orientation in the blow moulding. To further improve these properties and to increase the heat resistance the containers can also be heat-set or crystallized after the biaxial orientation. This is a heat treatment at a temperature exceeding the orientation temperature range. The mouth region of the container is not heat-set when this is done.

However, to impart the improved properties to the mouth region as well is known (FR-A-2,429,660, US-PS 4,589,559) to heat-set the mouth region as well. Prior to or after the blow moulding of the container the mouth section of the container provided with a thread is heated by a heat source to the temperature necessary for the crystallization and heat-set.

The invention is based on the problem of providing a method of heat-setting the mouth section of a container with which advantageous properties of the container mouth or opening can be achieved.

Said problem is solved according to the invention.

According to the invention the end of the parison subsequently to be reshaped or remoulded to form the mouth section is heat-set. The tube end of the parison or preform is heated to the crystallization temperature, i.e. almost up to the melting point. In this phase a certain period of time is allowed to pass in which the desired crystallization takes place. Thereafter the crystallized mouth end is remoulded to the desired mouth section which as a rule has a thread. The mould used for this purpose is cooled. In this manner a finished parison with stable dimensions fixed by the mouth mould is obtained. Because of the intended function, these dimensions must have very small tolerances. The invention avoids the possibility of the very intensive temperature necessary for the crystallization deforming the already finished moulded mouth end.

Further developments according to the invention are characterized in the subsidiary claims. They relate in particular to a parison with which the method of the invention can be advantageously carried out. On the one hand, this may be an extruded preform. On the other hand, an injection-moulded preform is preferred. Thus, it can be shown that an injection-moulded parison of PET has an appreciably lower viscosity than extruded PET and moreover crystallizes considerably faster. This is a considerable advantage in the series production in a fast-running machine. Furthermore, an injection moulding permits in the mouth region formation of a wall thickness adapted to the moulding. Thus, as a rule the wall thickness in the mouth region is made smaller than the wall thickness of the remaining parison adapted to the blowing of the orientated bottle. Finally, injection-moulded parisons can be made in comparatively simple injection moulds.

After the heat-setting the mouth end is reformed in known moulding means and the blow-moulding step then carried out.

An example of embodiment of the invention is explained hereinafter with the aid of the drawings.

FIG. 1 shows a section through the open end of an injection-moulded parison and

Figure 2:
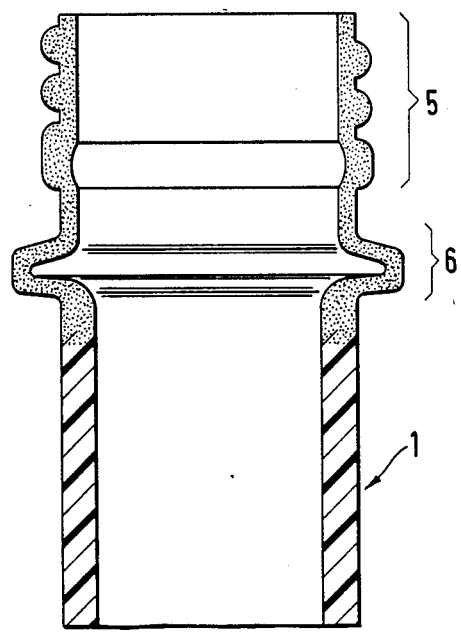

FIG. 2 a section through the mouth section provided with a thread after the crystallization and moulding.

FIG. 1 shows the open end of a parison 1 which is made in an injection mould. The mouth end 2 consists of two sections 3 and 4 of which the section 3 has a smaller wall thickness.

The mouth end 2 is subjected to a heat treatment in which it is heated to crystallization temperature close to the melting point of PET, whereupon the crystallization takes place. In the hot plasticized state the mouth end is introduced into a mould, not shown, in which the thinner section 3 is reformed to a thread 5 whilst the thicker section 4 is formed to a flange 6. For the reforming an outer mould suffices if on the inside the material is pressed with a mandrel and with the aid of blowing air against the outer mould. The thread 5 and the flange 6 form the mouth section of the now finished parison heat-set in the mouth section. The heat-set section, which is shown in dot line, need not extend into the region of large wall thickness. The parison is then inserted into a blow mould and in known manner blown to form the finished container with biaxial orientation.

We claim:

1. Method of making a blow-molded container from a thermoplastic polyester comprising the steps of forming a parison having a mouth section to be provided with a closure attachment configuration to subsequently serve for detachable fitting of a closure member; first heat setting the mouth section by heating the mouth section to the crystallization temperature of the thermoplastic polyester for a period of time sufficient to effect crystallization of the mouth section; after the mouth section is heat set introducing the mouth section of the parison into a mold and forming the closure attachment configuration in the heat set mouth section; and blow molding the parison to make the container with biaxial orientation.

2. Method according to claim 1, characterized in that the closure attachment configuration comprises a thread.

3. Method according to claim 1, characterized in that the mouth section end is cooled in the mould.

4. Method according to claim 2, characterized in that the mouth section end and closure attachment configuration is cooled in the mould.

* * * * *